United States Patent [19]

Fujii et al.

[11] Patent Number: 4,840,303
[45] Date of Patent: Jun. 20, 1989

[54] METHOD AND APPARATUS FOR CUTTING AND WELDING STEEL STRIPS

[75] Inventors: Mamoru Fujii, Kurashiki; Kazuo Noda, Kobe; Shoji Nagasaka, Kobe; Hiroshi Tajika, Kobe; Koji Ono, Kobe, all of Japan

[73] Assignee: Kawasaki Steel Corporation, Hyogo, Japan

[21] Appl. No.: 92,913

[22] PCT Filed: Feb. 26, 1987

[86] PCT No.: PCT/JP87/00123
§ 371 Date: Dec. 28, 1987
§ 102(e) Date: Dec. 28, 1987

[87] PCT Pub. No.: WO87/05244
PCT Pub. Date: Sep. 11, 1987

[30] Foreign Application Priority Data

Feb. 28, 1986 [JP] Japan ................... 61-43189
Mar. 11, 1986 [JP] Japan ................... 61-54406
Dec. 25, 1986 [JP] Japan ................... 61-311111
Feb. 9, 1987 [JP] Japan ................... 62-29177

[51] Int. Cl.[4] .................. B23K 26/02; B23K 26/10
[52] U.S. Cl. ........................... 228/164; 228/170; 228/171; 228/5.7; 228/49.4; 219/121.63; 219/121.64; 219/121.82; 219/161
[58] Field of Search ............. 228/164, 170–172, 228/212, 213, 5.7, 13, 44.3, 49.4; 219/161, 121.63, 121.64, 121.82, 61.3, 59.1, 61.13

[56] References Cited

U.S. PATENT DOCUMENTS 3,582,609 6/1971 Morley et al. ................ 219/161
4,139,145 2/1979 Moore ......................... 228/5.7
4,563,563 1/1986 Ege ............................ 228/5.7

FOREIGN PATENT DOCUMENTS

2422295 11/1974 Fed. Rep. of Germany ....... 228/5.7
90949 8/1976 Japan ........................ 228/5.7
43743 4/1977 Japan ........................ 228/5.7
31489 2/1982 Japan ........................ 228/5.7
102480 6/1982 Japan ........................ 228/5.7
102495 6/1982 Japan ........................ 228/5.7
151986 9/1983 Japan ........................ 228/5.7
212193 12/1984 Japan ........................ 228/49.4
113190 7/1985 Japan ........................ 228/5.7
846197 7/1981 U.S.S.R. .................... 228/49.4

*Primary Examiner*—Nicholas P. Godici
*Assistant Examiner*—Samuel M. Heinrich
*Attorney, Agent, or Firm*—Sughrue, Mion, Zinn, Macpeak & Seas

[57] ABSTRACT

A method, for butt-welding steel strips using a laser beam are disclosed, in which opposite ends of preceding and succeeding steel strips fed continuously are cut and the cut end edges thus formed are welded by butt welding using a laser. The cutting and butting at the time of welding are effected with one edge of the preceding steel strips adjacent to the opposite ends of the succeeding steel strips aligned to be parallel with the center line of travel of the continuous processing line. When effecting the alignment, the preceding or succeeding steel strip is attracted by an electromagnetic chuck on a work table in the continuous processing line and is pulled by the chuck toward a reference block provided with an alignment edge parallel to the center line of travel of the processing line to bring the edge of the sheet into contact with the reference block. The alignment is done in this state.

15 Claims, 10 Drawing Sheets

METHOD AND APPARATUS FOR CUTTING AND WELDING STEEL STRIPS

FIELD OF THE INVENTION

This invention relates to a method and an apparatus for cutting and welding steel strips. More particularly, the invention concerns a method and an apparatus for cutting and welding steel strips for a steel strip processing line, in which facing ends of preceding and succeeding steel strips are cut in the width-wise direction and the cut surfaces are welded together as butt surfaces to obtain a butt joint whereby the resultant joined steel strips can be subject to continuous rolling, stamping and other processings, and in which at the time of the cutting and butt welding of steel strips the facing ends thereof
are cut with high accuracy and are butt welded by a laser beam, for instance, with the center line of the steel strips aligned to be in register or parallel with the center line of the processing line, thus permitting high accuracy joining of the steel strips and permitting a high quality welded artifact to be obtained.

BACKGROUND OF THE INVENTION

Heretofore, in order to perform rolling and other processing ancillary thereto on steel strips (hereinafter referred to as rolling processing) in a steel strip processing line, between two adjacent steel strips continuously supplied to the steel strip processing line, an end-to-end connection is achieved by butting and welding their opposite end edges. Also, such processing and rewinding, welding, slitting and cutting (hereinafter referred to as conditioning processing) are performed on steel strips of silicon steel, and then resultant steel strips are supplied as a product to the customer. Especially, in order to obtain a product having a unit weight required by the customer, steel strips are joined together by butt welding, thereby obtaining continuous steel strips having an end-to-end connection therein and cutting continuous steel strips as the product having said unit weight and then supplying to the customer the product in the form of coils or sheets. Therefore, the product, without aftertreatment of the weld portion formed during such conditioning processing is delivered to the customer, so that it is required to obtain a weld portion of high quality. Particularly, from the standpoint of reducing power loss, strips of silicon steel are required to be rolled to a thickness of about 0.35 mm or less. Therefore, such thin steel strips are required to be welded together before they are supplied to the customer. However, as to such thin strips, it is impossible to obtain a weld portion of high quality, as above described, by edge-preparation of cutting opposite ends of adjacent strips using the prior art shearing technique and then by butt-welding the resultant end edges thereof by prior art arc welding, such as TIG or MIG.

Namely, in both the former case of rolling processing and the latter case of conditioning processing between adjacent steel strips, the trailing end of a preceding steel strip and the leading end of a succeeding steel strip are cut by using the prior art shear welder forming a continuous process, and then the cut end edges opposed each other are caused to be butt-welded by the arc welding, i.e., TIG or MIG. In other words, in a continuous processing line constructed by the prior art shear welder, steel strips are caused to run from the upstream to the downstream, and there, are provided along this flow of steel strips, a cutting unit and a welding unit of steel strips at first end of the steel strip is cut by the shearing unit existing on the upstream, and then the strip is transferred to the downstream, where the opposite cutting ends between adjacent steel strips are butted and welded by the arc welding technique, such as TIG or MIG.

However, in the case of the arc welding, i.e., TIG or MIG, a large thermal influence zone is generated and also the width of the weld bead tends to be large. The arc welding technique therefore is unsuitable for butt-welding processes during conditioning processing of thin steel strips such as silicon steel strips. That is, when the MIG or TIG arc welding is used during the conditioning processing thin steel strips with a weld portion of good quality cannot be obtained. Therefore the joined steel strip is wound into the form of a coil without taking off the weld portion including the steel strip, flaws are generated in the steel strip, thus greatly deteriorating the quality of the product. For this reason, owing to avoid troubles with customer, it has been in practice to remove the weld portion of the steel strip, when the steel strip is wound as a coil.

Recently, high performance laser welding processes and laser welders have been developed and a high quality weld portion can be obtained by using the laser welding process. When the high performance laser welding is used for butt welding during conditioning processing of a thin silicon steel strip a continuous steel strip having a weld portion of high quality can be obtained, so as to be wound in the form of a coil without removing the weld portion. By so doing, no substantial flaw is generated.

Further, the laser welding process permits sufficient effects and great advantages to be obtained when it is used for butt welding during the conditioning processing of silicon steel strips. That is, the weld bead of the weld portion obtained by laser welding has a very small width and the weld portion is substantially free from thermal influence. This means that it is not necessary in a product of laser welding to remove the weld portion on the jointed steel strip, which may be punched out by the customers during a continuous stamping out of patterns on the sheet, without applying any treatment to the weld portion by themselves. This point is very advantageous for the customers. Actually, punching of silicon steel strips is usually processed in high speed continuous stamping equipment which is proved by the customer. Therefore, very long jointed steel strips are strongly desired for increasing the punch efficiency on the side of the customer.

However, the advantage of the effective laser welding as noted above cannot be obtained simply by a substitution of a laser welding torch in place of the TIG or MIG welding torch of the prior art shear welder. In other words unless edge preparation by cutting opposed ends of steel strips and butting of cut end edges opposing each other is done with high accuracy the desired effects of the laser welding cannot be obtained so that a high quality weld portion cannot be obtained. For the sake of reference, a high quality weld portion which meets the customer's demands is defined as follows:

(a) that weld portion is homogenous and conforms to a predetermined reference.

(b) that mechanical characteristics of weld portion conforms to those decided by predetermined reference, and (c) that the weld portion is free from bends or failure of alignment of end edges of steel strips (i.e., failure of alignment means that a line, which is formed by butted and edges of steel strips, is not conformity with a straight line perpendicular to the center line of the shear welder).

For reducing ore loss, there is a trend for reducing the thickness of silicon steel strips, particularly directional steel strips having crystalline anisotropy, from about 0.35 to 0.30 mm to about 0.35 to 0.15 mm or below. The smaller the thickness, the more difficult it is to cut steel strip ends with high accuracy and butt the cut end surfaces with high accuracy and without formation of any gap.

Further, where rolling and heat-treatment are applied to cold-rolled thin steel strips, which are rewound from a coiled form, before being supplied as a product, steel strips to be rewound are joined together by welding, in order to perform a continuous rolling operation. In this case in the past by using the TIG. MIG and like welding processes, the rewound cold-rolled steel strips were joined to each other, but recently it has been tried to use the laser welding process which features a high energy density. The reason for this is the same as for silicon steel strips. That is with laser welding it is possible to provide as small laser beam diameter as up to about 0.1 mm. It is thus possible to increase the energy density and reduce thermal influence, so that weld beads having a flat surface can be readily obtained.

This means that a laser welding permits welding of cold-rolled thin strips having a thickness of 0.05-1.0 mm such as stainless steel strips and silicon steel strips. Such thin steel strips are incapable of being welded by the prior art TIG or MIG welding processes. Even in this case, however the use of the laser welding requires highly accurate cutting and butting prior to butt welding. Particularly it is important to cut ends of steel strips accurately along a straight line perpendicular to the center line of the steel strips in conformity with one of continuous processing line and effect the butting of the cut ends such as not to produce departure from the alignment of the end edges of the butted steel strips.

To meet these requirements, there have been developed techniques of accurately cutting ends of steel strips and causing accurate butting of the cut ends prior to butt-welding. One such technique is disclosed in Japanese Utility Model Laid-Open No. 57-102495.

Namely, in order to avoid departure from the alignment of weld line formed by butt-welding the cut end edges of steel strips should be straight and perpendicular to the center line of the steel strips, i.e.. perpendicular to the direction of travel of the continuous process line. In addition, during butting resultant cut edges of steel strips a straight alignment should be formed between cut edges opposed each other. The Japanese Utility Model Laid-Open No. 57-102495 disclose an aligning device for securing one side edge of a steel strip such that it is parallel to the center line of the steel strip. In this aligning device a side guide is secured to one side of a work table at a cutting or welding position of a continuous processing line so that the side guide is parallel to the center line of travel of the continuous processing line. One side edge of the steel strip is urged against the side guide thereby making an alignment of the center line of steel strip with the center line of travel of the continuous processing line. Therefore, in such alignment the cutting or butting of the steel strip is done prior to welding.

However, since this aligning device moves the steel strip with the press (conveyor) belt in contact with the surface of the steel strip, press flaws are liable to be formed on the surface of the steel strip, particularly the surface of a very thin steel strip, by the urging force of the press belt and movement thereof in the widthwise direction of the work table. Further when the steel strip is very thin, it is liable to adhere to the surface with the work table on the continuous processing line such as on a shear welder. Therefore, it is difficult to move the steel strip in the widthwise direction towards the side guide for alignment by pressing against the surface of the steel strip. Therefore, even if this aligning device is used it is difficult to obtain a weld portion free from any edge alignment departure.

Denoting the coefficient of friction between the press belt and steel strip by $\mu_1$, the coefficient of friction between the steel strip and the work table by $\mu_2$, the urging force of the press belt by N, and the weight of the steel strip by W, the force, with which the steel strip is pulled by the process belt, is $$N\mu_1 - (N+W)\mu_2 = N(\mu_1 - \mu_2) - W\mu_2$$

This relation means that in order for pulling the steel strip by the press belt it is necessary to meet a condition $\mu_1$ greater than $\mu_2$.

Further, since the weight W of the steel strip varies with the thickness and width of the strip, it is necessary to adjust the urging force N of the press belt. Furthermore, with a thin steel strip, an excessive pulling force will cause a strain of the strip after the side edge thereof has been brought into contact with the side guide. In such a case, the side edges of the two steel strips will not be truly straight after subsequent cutting and butting. A desired accuracy of the joint thus cannot be obtained.

In the meantime in order to stop the steel strip as soon as one side edge thereof is brought into contact with the side guide of the work table, it may be contemplated to use a high accuracy sensor, a continuous motor, etc. However, such equipment is expensive and poses many problems in practice so that it has not yet been employed in practice.

SUMMARY OF THE INVENTION

A first feature of the invention resides in a continuous processing line in which facing ends of preceding and succeeding steel strips are cut and the cut end surfaces are caused to abut as abutting surfaces and are welded along the abutting line formed by the abutting, in that when cutting, abutting and welding facing ends of the steel strips, at the time of the cutting or abutting prior to the welding, either the preceding steel strip or the succeeding steel strip is attracted by an electromagnetic chuck in at least one work table in the continuous processing line, and the electromagnetic chuck is moved to pull the preceding or succeeding steel strip until it strikes an edge of a reference block disposed parallel to the center line of the continuous processing line to align one edge of the preceding or succeeding steel strip to be parallel to the center line.

Thus according to the invention, at the time of cutting and/or welding the underside of the steel strip is attracted by the electromagnetic chuck and is pulled in the widthwise direction toward the edge of the reference block to align the edge of the strip. Thus, even with steel strips having a thickness of 1 mm or less particularly as thin as 0.1 mm in thickness, it is possible to obtain accurate alignment of the edge.

A second feature of the invention resides in that by moving the electromagnetic chuck the preceding or succeeding steel strip is pulled toward the reference block extending parallel to the center line of the continuous processing line to bring an edge of the preceding or succeeding steel strip into contact with the reference block and that immediately thereafter the magnetic force of the electromagnetic chuck is adjusted by the current to cause a slip of the preceding or succeeding steel strip with respect to the electromagnetic chuck, thus aligning the edge. Thus, even with the steel strips with a thickness of 1 mm or less, particularly as thin as 0.1 mm in thickness, when the edge of the steel strip is brought into contact with the reference block, a slip of the steel strip with respect to the electromagnetic chuck is caused through adjustments of the magnetic force of the electromagnetic chuck with current adjustment, whereby it is possible to eliminate unnecessary pulling force applied to the edge of the steel strip so that no strain remains.

A third feature of the invention resides in that when causing the abutting of the two cut end surfaces of steel strips prior to welding the end surfaces with a welding torch in the widthwise direction of the steel strips in the continuous processing line, the facing end of one of the steel strips is attracted and held by an electromagnetic chuck upstream or downstream the torch running line, on which side the torch running line is not contained, the facing end of the other steel strip is raised so that the cut end surface is directed obliquely and downwardly toward the cut end surface of the other steel strip, and in this state the abutting surfaces of the two steel strips are caused to about. Thus, according to the invention for butt welding the facing ends of the preceding or succeeding steel strips, the preceding steel strip with the cut trailing end surface can be held and magnetized by the electromagnetic chuck provided on the side, which is free from the torch running line, with the cut end surface as the abutting surface in register wit the center line of the continuous processing line. Then, the succeeding steel strip with the cut leading end is raised by suitable means. e.g., a roller to direct the cut end surface at the leading end obliquely downwardly toward the end surface of the preceding steel strip. Since the trailing end of the preceding steel strip has been magnetized by the electromagnetic chuck, when the succeeding steel strip is moved such the butt surface at its leading end directed obliquely and downwardly and the butt surface approaches the butt surface at the trailing end of the preceding steel strip, the butt surface is pulled and attracted to the butt surface of the preceding steel strip whereby it is possible to obtain a butt joint which is in accurate register with the running line of the welding torch.

A fourth feature of the invention resides in that a movable work table movable in the direction of the steel strip feeding line is provided as one of the work tables in the continuous processing line such that it is capable of revolution with respect to a point of intersection between one reference surface of the movable work table and a running line of the welding or cutting-/welding torch, and at least two optical enlargement devices are provided on the movable work table for optically enlarging the opposite ends of the butt line formed wit the abutting of the cut end surface of the two steel strips and are constructed such that they are reciprocable in a direction perpendicular or substantially perpendicular to the running line of the two steel strips. Thus, alignment can be monitored by optically enlarging the opposite ends of the butt line with the optical enlargement devices. Particularly when the optical image is processed with an image sensor the alignment can be done automatically.

DETAILED DESCRIPTION OF THE INVENTION

The invention will first be described by reference to the figures.

Figure 1:
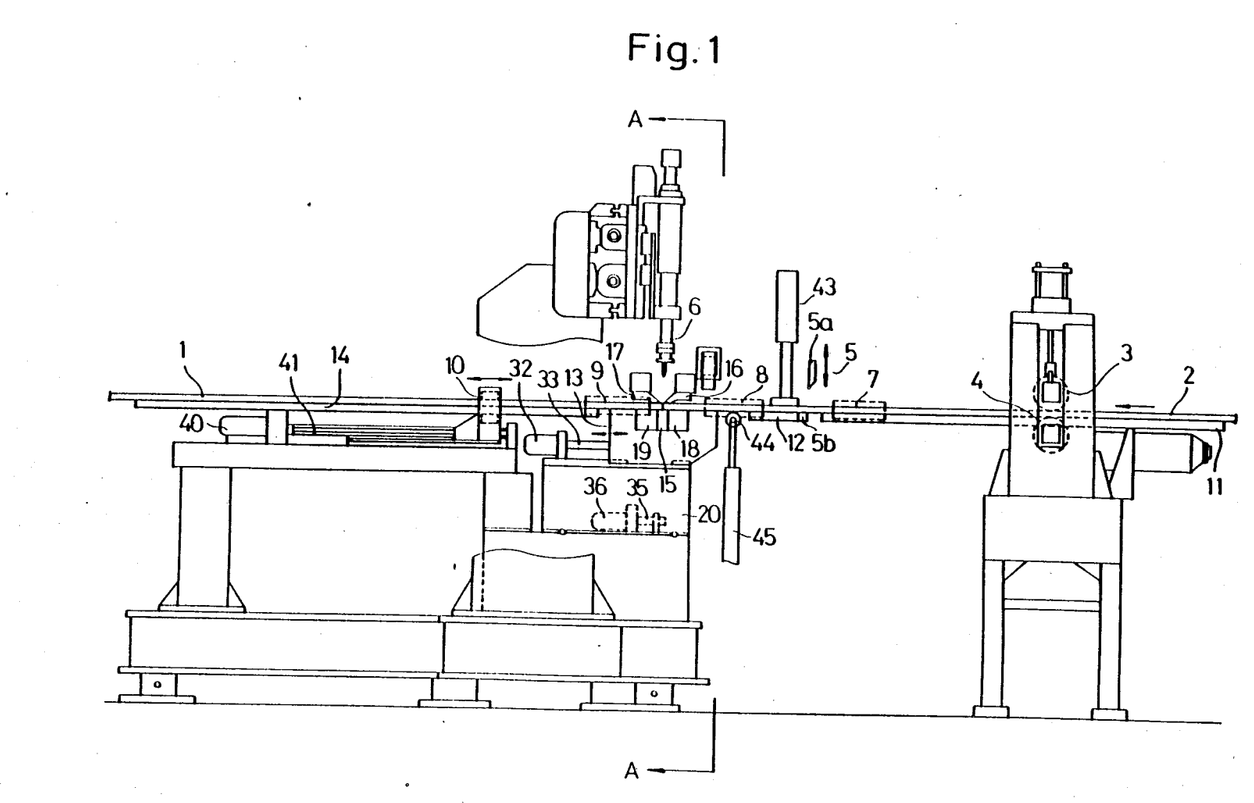
FIG. 1 is a side view showing a cutter/welder utilizing a laser beam in an embodiment of the invention.

Referring now to FIG. 1, reference numeral 1 designates a preceding steel strip and numeral 2 succeeding steel strip. These steel strips 1 and 2 are consequentively fed by a pair of pinch rollers 3 and 4 to a cutter/welder which constitutes part of a continuous processing line. The cutter/welder includes a cutting unit 5 and a welding torch 6 provided in the mentioned order from the upstream side. Aligning units 7 to 9, as shown by dashed lines in FIG. 1, are provided before, between and after the cutting unit 5 and welding torch 6 in the direction of travel of steel strips. Detailed construction of the aligning units 7 to 9 is shown in FIG. 5.

Figure 5:
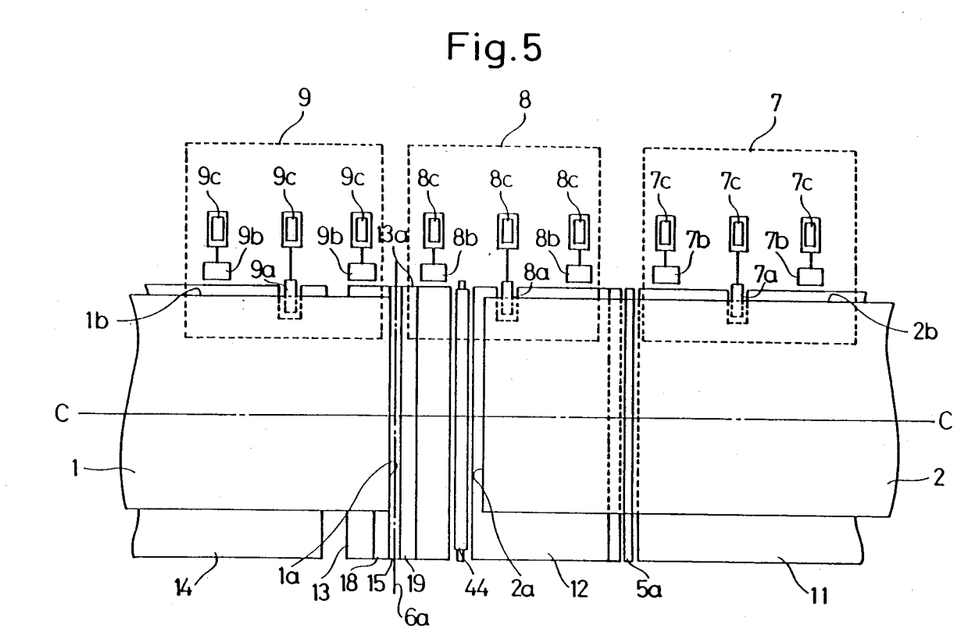
FIG. 5 is a plan view showing an example of aligning units constituting part of the cutter/welder shown in FIG. 1.

In the cutting and welding operation, one side edge of the preceding steel strip 1 fed by the upstream side pinch rollers 3 and 4 is positioned by the aligning unit 8 such that one side edge is parallel to the center line of travel of the continuous processing line C—C (see FIG. 5). In this state the trailing end of the preceding steel strip 1 is cut by the cutting unit 5.

After the cutting the preceding steel strip 1 is further transported by a movable clamp 10 to the downstream side to be stopped when its cut end edge la comes to a position beneath the welding torch 6. Beneath the welding torch 6, one side edge of the preceding steel strip 1 is positioned by the unit 9 to make it parallel to the center line C—C of the continuous processing line (see FIG. 5). Also, the cut end edge 1a of the preceding steel strip 1 is brought in conformity with a line 6a (see FIG. 5) along which the welding torch 6 is moved by causing movement of a work table 13 beneath the welding torch 6 in the direction of feed in the continuous processing line and also revolution of the work table 13 about a revolving section 21 (see FIG. 2).

After the preceding steel strip 1 has been set in this state, the succeeding steel strip 2 is fed by the pair of pinch rollers 3 and 4. The leading end of the succeeding steel strip 2 is positioned by the aligning unit 7 such that one side edge of strip 2 is parallel to the center line C—C of the continuous process line. In this state, the leading end of strip 2 is cut by the cutting unit 5.

Subsequently, the succeeding steel strip 2 is further fed by the pair of pinch rollers 3 and 4 to the downstream side and beneath the welding torch 6 the leading end of the succeeding steel strip 2 is aligned by the aligning unit 8 such that one side edge of strip 2 is parallel to the center line C—C of the continuous process line. Also, as shown in FIG. 6(d). the cut end edge 2a of the leading end of the succeeding steel strip 2 is directed downwards for butting against the cut edge 1a of the preceding steel strip 1 having been positioned to be in conformity with the torch running line 6a (see FIG. 5). In this state, the butted end edges 1a and 2a are butt-welded together by driving the laser welding torch 6 along the line 6a.

As shown in FIG. 1, a plurality of work tables 11 to 14 are arranged along a straight line constituting a feed path, along which the preceding and succeeding steel strips 1 and 2 are fed. Of these work tables 11 to 14, the work table 13 which is disposed underneath the welding torch 6 is capable of being moved in the direction of the continuous processing line. i.e.. feed path, and also revolved about the revolving section 21 (see FIG. 2). By causing the parallel movement and revolution of the movable work table (hereinafter referred to as movable table 13) after one side edge of the preceding steel strip 1 has been aligned, the cut end surface 1a of the preceding steel strip 1 can be finally disposed such that it is accurately in register with the torch running line 6a, which is positioned to be precisely perpendicular to the center line C—C in the continuous processing line.

In the cutter/welder which constitutes part of the continuous processing line, the upstream side cutting unit 5 is usually provided as a shearing unit with a shear or the like or a fusion severing unit for effecting fusion severing with a laser beam or a cutting unit for effecting cutting with a grindstone. The welding torch (hereinafter referred to as the torch) 6 is provided on the downstream of the cutting unit 5. At this time, the torch 6 running line 6a is positioned such that it extends in a direction precisely perpendicular to the center line C—C of the continuous processing line (see FIG. 5). i.e., the direction of running of the preceding and succeeding steel strips 1 and 2, and then the torch 6 is provided such that it can run along the torch running line 6a. The movable table 13 which is provided underneath the torch 6 is constructed such that it can undergo parallel movement in the direction of running of the preceding and succeeding steel strips 1 and 2. i.e.. along with center line C—C of the continuous processing line. Also, it is provided on a revolving table 20 to be noted above such that it can be revolved about the revolving section 21 (see FIG. 2).

The torch 6 is constructed such that it is vertically movable and can also run in stringent register with the torch running line 6a positioned to be perpendicular to the direction of running of the preceding and succeeding steel strips 1 and 2 fed along the center line C—C of the continuous processing line. On the opposite sides of the torch 6, securement clamps 16 and 17 are provided such that they are vertically movable. On the movable table 13a back bar 15 is provided in register with the torch running line 6a (see FIG. 5). Downstream and upstream side electromagnetic chucks 18 and 19 are provided on the opposite sides of the back bar 15. Thus, in the butting and welding operations, the trailing end of the preceding steel strip 2 and the leading end of succeeding strip 2 are held from their end surfaces by the securement clamps 16 and 17 respectively. On the movable table 13 the trailing end of the preceding steel strip 1 and leading end of the succeeding steel strip 2 are held by magnetization by the downstream and upstream side electromagnetic chucks 18 and 19.

The mechanism for causing the parallel movement and revolution may have any desired construction. To ensure accurate butting, the revolving table 20 is constructed, as shown in FIG. 2, such that it is capable of revolution about the revolving section 21 and the movable table 13 can undergo parallel movement on the revolving table 20.

The revolving table 20 is disposed on a stationary table 37. On the stationary table 37, the revolving table 20 is capable of revolution about the intersection between one reference side surface 13a of the movable table 13 and the torch running line 6a (see FIG. 5). For example, revolving table 20 is capable of revolution.

To permit precise adjustment of the parallel movement of the movable table 13 or revolution of the revolving table 20, a moving mechanism and a butted state detection mechanism maybe constructed as follows.

Figure 2:
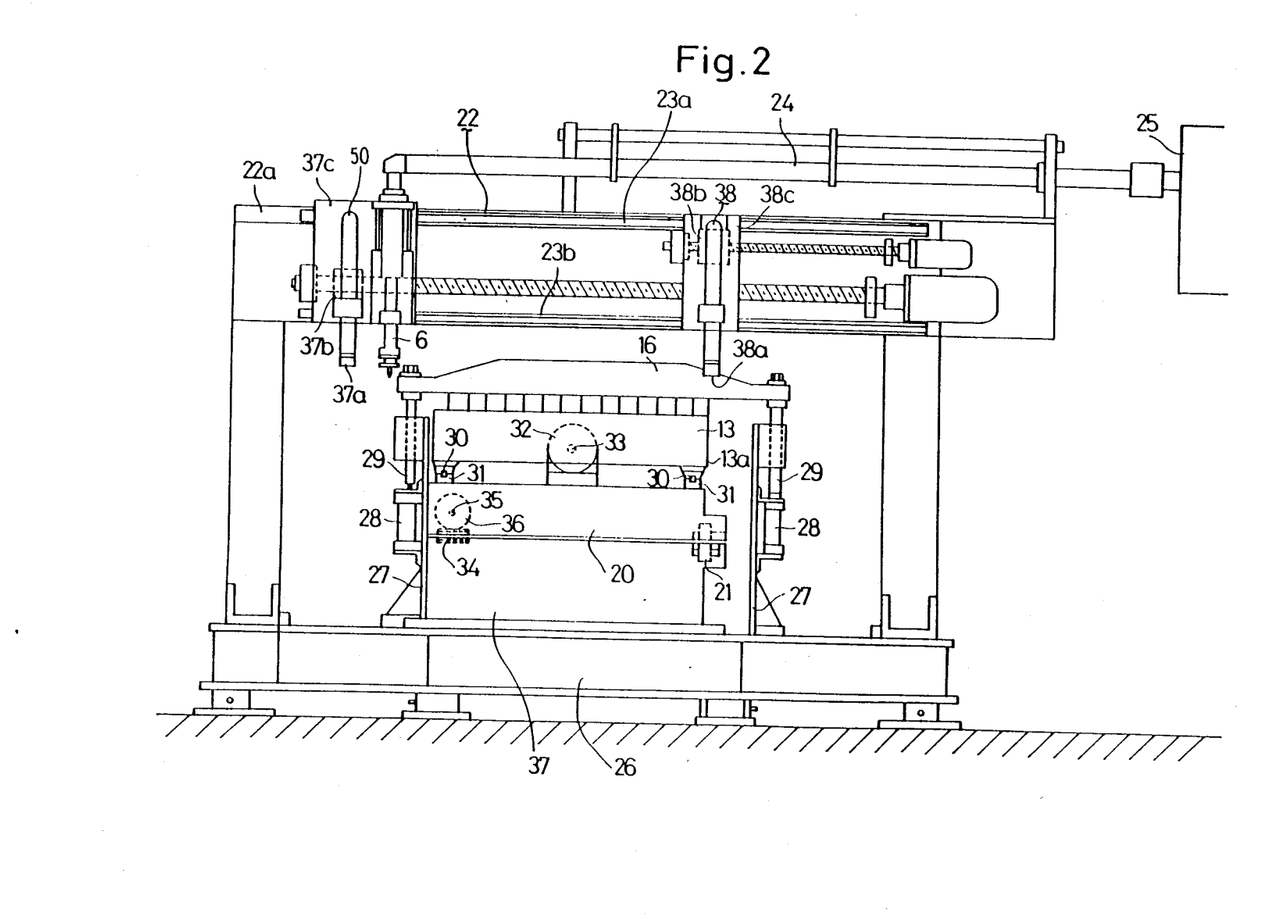
FIG. 2 is a front view partly in section, taken along arrow line A—A in FIG. 1

As shown in FIG. 2, of the work tables 11 to 14 constituting the feed path of the preceding and succeeding steel strips 1 and 2, i.e., the running path of the continuous processing line, the movable table 13 is straddled by a gate-shaped frame 22 provided on a base 26. A top beam 22a of the gate-shaped frame 22 is provided with upper and lower tracks e.g., rails 23a and 23b. extending in its longitudinal direction. The torch 6 is provided such that it can run along these rails 23a and 23b. A laser beam is supplied from a laser beam generator 25 to the torch 6, and it is converged to a diameter of about 0.1 mm to effect butt welding of the steel strips 1 and 2 by using the laser beam. A laser beam path 24 is provided extensively along the beam 22a of the gate-shaped frame 22. The torch 6 is coupled to the front end of the laser beam path 24, and the laser beam generator 25 is coupled to the rear end of the laser beam path 24. Thus, the laser beam emitted from the laser beam generator 25 is fed through the laser beam path 24 to the torch 6. As the torch 6 runs along the torch running line 6a (see FIG. 5), the laser beam path 6a is extended or contracted, whereby the two steel strips 1 and 2 are butt-welded by using laser beam.

A mechanism for raising and lowering the downstream and upstream side securement clamps 16 and 17 may have any structure. Usually, the mechanism is constructed as a piston-cylinder mechanism. Besides, it is constructed that it operates in an interlocked relation to the movable table 13, revolving table 20 and stationary table 37.

More specifically, the two securement clamps 16 and 17 may be constructed to have the same construction, and the raising and lowering mechanism may be provided independently on each securement clamp. FIG. 2 shows a typical construction of the mechanism for raising and lowering the upstream side securement clamp 16. The mechanism consists of a pair of support pillars 27 provided inside the gate-shaped frame 22, cylinders 28 mounted on the respective support pillars 27 and rods 29 driven by the operating fluid of the cylinders 28. The upstream side securement clamp 16 is mounted on the top of the rods 29, and it is raised and lowered with the elongation and contraction of the rods 29. The mechanism for raising and lowering the downstream side securement clamp, which is not shown, has the same construction.

To permit revolution of the revolving table 20 and also permit movement of the movable table 13 along the revolving table 20, the revolving table 20 is provided on the inner side of the pair support pillars 27 constituting part of the raising/lowering mechanism. Rectilinear sliding bearings 31 are provided on the top of the revolving table 20 and the bottom of the movable table 13, respectively and bearing rails 30 are interposed between the upper and lower translational bearings 31. Thus, the movable table 13 is moved along the revolving table 20 in the direction of running of the preceding and succeeding steel strips 1 and 2. i.e., the center line C—C of the continuous processing line (see FIG. 5). At the time of the butting operation, the movable table 13 is moved by slight amounts to bring the butting end edge 1a of the preceding steel strip 1 into register with the torch running line 6a (see FIG. 5) and also make a butting line formed between the opposite end edges of two steel strips 1 and 2 to be in register with the torch running line 6a. A parallel movement unit for causing a parallel movement of the movable table 13, as shown in FIG. 1, consists of a numerical control motor 32 provided on the revolving table 20 and a ball screw 33 coupled to the numerical control motor 32. The end of the ball screw 33 is coupled to the movable table 13. For this reason, even if the extent of parallel movement for causing the torch running line 6a and butting line into register with each other is very slight, the numerical control motor 32 can be correspondingly driven to a slight extent to obtain accurate butting of the two cut end edges 1a and 2a.

As mentioned above, the revolving table 20 is caused to undergo revolution about the revolving section 21, which is located at the intersection between the reference side edge 13a of the movable table 13 (see FIG. 2). i.e., the edge parallel to the center line of the continuous processing line, and the torch running line. The revolving mechanism for revolving the table 20 about the revolving section 21 of the intersection, may consist of a cylindrical bearing 34, a ball screw 35 and a numerical control motor 36. More specifically, as shown in FIG. 2, the cylindrical bearing 34 is provided between the revolving table 20 and stationary table 37, the ball screw 35 is aligned to the cylindrical bearing 34, and the numerical control motor 36 is coupled to the ball screw 35. Therefore, even if the revolution caused to bring the torch running line 6a and butting line into register with each other is to a very slight extent. e.g., of the order of microns the numerical control motor 36 can be given a corresponding rotation.

Further, as will be described later, it is necessary to obtain perfect register of the butting line with the torch running line 6a (see FIG. 5) after the end edges 1a and 2a of the preceding and succeeding steel strips 1 and 2 (see FIG. 5) have been butted on the movable table 13. This is done by causing parallel movement and revolution of the movable table 13 to a slight extent. To detect the extent of such movement at least two optical enlargement units 50 and 38 are provided for optically enlarging the two opposite ends of the butting line. These two optical enlargement units 50 and 38, like the torch 6, are adapted to run in a direction perpendicular to the center line C—C of the continuous processing line (see FIG. 5).

More particularly, the optical enlargement units 50 and 38 have the same construction and respectively consist of microscopes 37a and 38a cameras 37b and 38b and movable saddles 37c and 38c. To permit running of the movable saddles 37c and 38c in a direction perpendicular to the center line C—C of the continuous processing line, the saddles 37c and 38c are engaged with the rails 23a and 23b of the torch 6, as shown in FIG. 2. It is possible to drive the movable saddles 37c and 38c independently instead of causing their movement along the same rails 23a and 23b as for torch 6.

Figure 3:
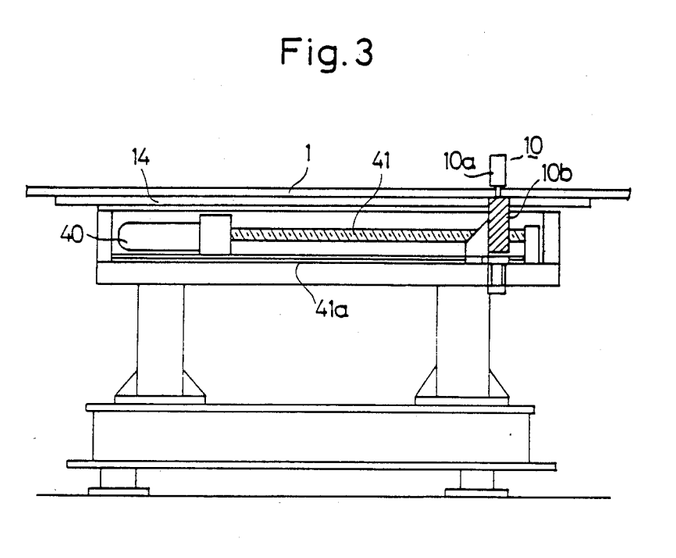
FIG. 3 is a side view, showing an example of the steel strip feeder.
Figure 4:
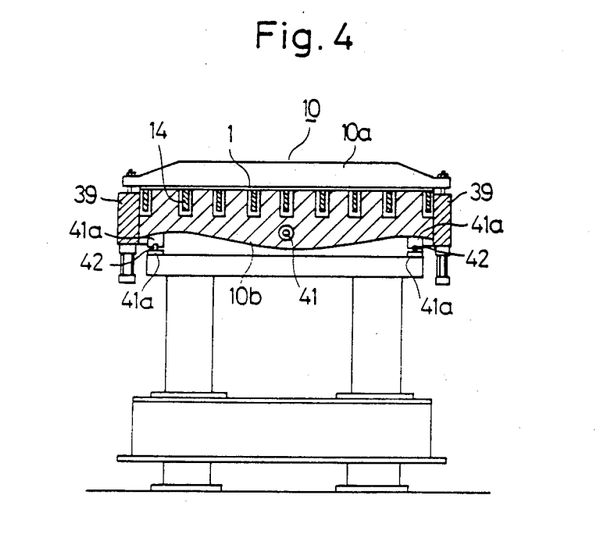
FIG. 4 is a transversal sectional view, showing the steel strip feeder shown in FIG. 3.

The movable clamp 10 for causing the preceding steel strip 1 to the downstream side after cutting the trailing end of the strip 1, as shown in FIGS. 3 and 4, consists of a pair of movable clamp pieces 10a and 10b. The upper clamp piece 10a can be raised and lowered by vertical movement cylinders 39 provided on the opposite sides of the lower clamp piece 10b. The lower clamp piece 10b has a comb-shaped top portion, which is assembled to the work table 14 which has a drain-board-like shape. The comb-shaped top portion of the lower clamp piece 10b slightly projects upwards from the work table 14. The preceding steel strip 1 thus can be smoothly clamped between the upper and lower clamps 10a and 10b without obstruction of its movement.

A mechanism for moving the movable clamp 10 consists of a numerical control motor 40, a ball screw 42 and a pair of bearings 41a and a bearing rail 42. Therefore, even if the extent of movement of the movable clamp 10 is very slight. e.g., of the order of microns, the rotation of the motor 40 can be controlled correspondingly and the movable clamp 10 can be moved accurately.

The cutting unit 5 for cutting the ends of the preceding and succeeding steel strips 1 and 2, usually consists of a pair of, i.e., upper and lower, blades 5a and 5b. as shown in FIG. 1, and which blades can cut the ends by using shearing. Instead of such cutting unit using shear force it is also possible to construct the cutting unit 5 so as to effect melting and cutting by using a laser beam, an electron beam or other heat sources. A scrap removal unit 43 may be provided, if necessary, to remove scrap produced as a result of the cutting operation from the work table 12.

The three aligning units 7 to 9, which are provided in the mentioned order from the upstream side as shown in FIG. 1, have the same construction as shown in FIG. 5.

As shown in FIG. 5, the aligning units 7 to 9 consist of respective electromagnetic chucks 7a. 8a and 9a and reference blocks 7b, 8b and 9b. The electromagnetic chucks 7a, 8a and 9a and reference blocks 7b, 8b and 9b can be moved by extension/contraction devices 7c, 8c and 9c in a direction perpendicular to the center line C—C of the continuous processing line. When cutting the trailing end of the preceding steel strip 1, the aligning unit 8 is used as noted below. More specifically, the opposite side reference blocks 8b provided outside of the continuous processing line are moved by the respective extension/contraction devices 8c to a reference position, at which they are parallel to the center line C—C of the continuous processing line. Then, the preceding steel strip 1 is fed by the upper and lower pinch rollers 3 and 4, as shown in FIG. 1, and the preceding strip 1 is stopped while trailing end of the preceding strip 1 is on the upstream side of the cutting unit 5 (only the upper blade 5a thereof being shown in FIG. 5). The central electromagnetic chuck 8a is partly incorporated into the work table 11. When the electromagnetic chuck 8a is excited at this time, the underside of the preceding steel strip 1 is attracted to the chuck 8a. In this state, the electromagnetic chuck 8a is pulled by the extension/contraction device 8c in a direction away from the continuous processing line in FIG. 5. The side 1b of the preceding steel strip 1 is thus pulled toward and brought into contact with the reference blocks 8b, so that it is aligned thereto. In this state, the side edge 1b of the preceding steel strip 1 is positioned parallel to the center line C—C of the continuous processing line. Thus, by lowering the upper blade 5a disposed perpendicular to the center line C—C in this state, the trailing end of the preceding steel strip 1 is cut to obtain the cut end edges 1a as the butting surface perpendicular to the center line C—C.

When cutting the leading end of the succeeding steel strip 2, one side edge 2b of it is aligned by the aligning unit 7 so that it is parallel to the center line C—C. Again, at this time, the end is cut in the same manner as for the preceding steel strip 1 to obtain the cut end edges 2a perpendicular to the center line C—C at the leading end of the succeeding steel strip 2. Further, when the cut end edge 1a and 2a of the steel strips 1 and 2 are butted on the movable table 13, the edges 1b and 2b are made parallel to the center line C—C. At this time, the preceding and succeeding steel strips 1 and 2 are aligned by the respective aligning units 9 and 8.

When aligning the side edges 1b and 2b of the steel strips with the aligning units 7 to 9 in the above way, it is desired to adjust the magnetic forces of the electromagnetic chucks 7a, 8a and 9a such as to permit slip of the electromagnetc chucks 7a 8a and 9a with respect to the two steel strips 1 and 2 with the side edges 1b and 2b thereof in contact with the reference blocks 7b, 8b and 9b, thus aligning the side edges 1b and 2b of the steel strips 1 and 2 to be parallel to the center line C—C.

More specifically the steel strips 1 and 2 are moved in a direction perpendicular to the center line C—C with their under side attracted to the electromagnetic chucks 7a, 8a and 9a by using electromagnetic forces, and thereby the side edges 1b and 2b of the steel strips 1 and 2 are brought into contact with the reference blocks 7b, 8b and 9b provided on the opposite sides of the electromagnetic chucks 7a, 8a and 9a. If the magnetic forces of the electromagnetic chucks 7a, 8a and 9a are excessive at this time, the side edges 1b and 2b of the steel strips 1 and 2 are liable to be stressed by the pulling force. In this case, the side edges 1b and 2b cannot be accurately aligned.

On the contrary, if the magnetic forces are insufficient, the steel strips 1 and 2 cannot be moved against the frictional resistance. Further the pulling force based on the magnetic forces of the electromagnetic chucks 7a, 8a and 9a are varied according to the thickness of the steel strips. That is, with the same current supplied to the electromagnetic chucks 7a, 8a and 9a the pulling force that is produced is large if the thickness of the sheet is large, while it is small if the thickness of the sheet is small. Meanwhile, the side edges 1b and 2b of the steel strips 1 and 2 are not easily strained when the thickness of the steel strips is large, while they are easily strained when the thickness is small.

Summing up, the proper pulling force should be adjusted to be in a range greater than the pulling force with which the steel strips 1 and 2 are moved to bring the side edges 1b and 2b into contact with the reference blocks 7b, 8b and 9b, but less than the pulling force with which the side edges 1b and 2b are stressed in contact with the reference blocks 7b, 8b and 9b. Therefore, when pulling the steel strips 1 and 2 with the electromagnetic chucks 7a, 8a and 9a, the magnetic forces of the electromagnetic chucks 7a, 8a and 9a are suitably adjusted as soon as each of the edges 1b and 2b is brought into contact with some of the reference blocks 7b, 8b and 9b. In this way, the steel strips 1 an 2 are aligned with respect to the electromagnetic chucks 7a, 8a and 9a. By aligning the side edges 1b, and 2b with respect to the steel strips 1 and 2 in this way, the pulling force is held in an adequate range at the time of the contact, so that the side edges 1b and 2b of the steel strips 1 and 2 can be aligned without generation of any strain. Until the side edges 1b and 2b are brought into contact, the pulling force can be increased, so that the steel strips 1 and 2 can be moved irrespective of their weight and thickness.

This effect is promoted by the provision of the reference blocks 7b, 8b and 9b on the opposite sides of the electromagnetic blocks 7a, 8a and 9a in the aligning units 7 to 9, as shown in FIG. 5, and the side edges 1b and 2b can be accurately aligned to be parallel to the center line C—C.

Namely, when the side edge 2b of the succeeding steel strip 2 is brought into contact with one of the opposite side reference block 7b, the pulling force of the electromagnetic chuck 7a gives to the succeeding steel strip 2 a rotational moment about one reference block 7b contacting the side edge 2b, by which rotational moment the side edge 2b of the succeeding steel strip 2 is brought into contact with the opposite side reference blocks 7b. As a result, the side edge 2b of the succeeding steel strip 2 is positioned parallel with the center line C—C. When a strong pulling force is subsequently exerted to the succeeding steel strip 2, a strain is liable to be generated in the side edge 2b. However, since the magnetic force is adjusted with the electromagnetic chuck 7a as soon as the succeeding steel strip 2 is brought into contact, a sliding of the succeeding steel strip 2 with respect to the electromagnetic chuck 7a is caused. Thus, regardless of stopping the chuck 7a at a proper position, it is possible to align the edge 1b of the succeeding steel strip without generation of any strain.

After each of the steel strips 1 and 2 has its opposite end cut by the cutting unit 5, the resultant edges 1a and 2a are jointed together by butt welding on the movable table 13 under the torch 6. For obtaining a perfect butting of end edge 1a and 2a , at the side of the movable table 13, there is provided a roller 44, which can be raised and lowered by a vertical movement cylinder 45. With the provision of the roller 44 in this way, it cooperates with the pair electromagnetic chucks 18 and 19 on the movable table 13 to cause the trailing end edge 1a of the preceding steel strip 1 to butt the leading end edge 2a of the succeeding steel strip 2 without any gap formed between the two end edges.

Figure 6A:
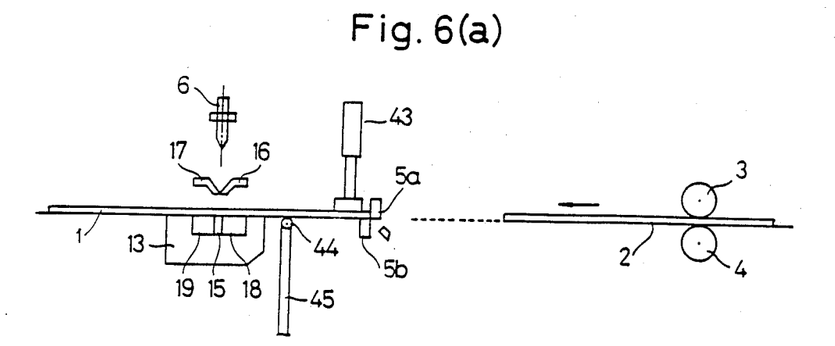
FIGS. 6(a) to (e) are views showing successive steps of cutting causing abutting and welding of steel strips according to the invention.
Figure 6B:
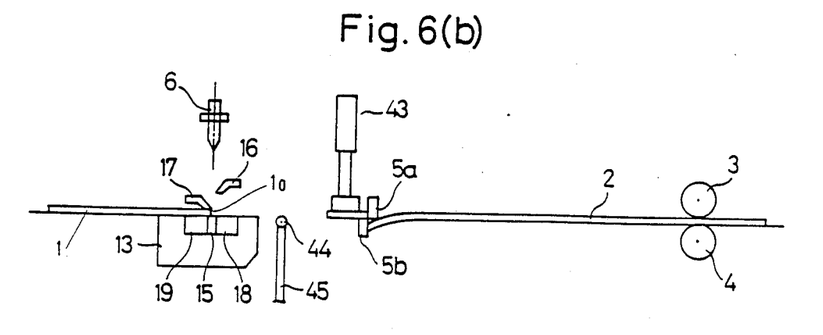
Figure 6C:
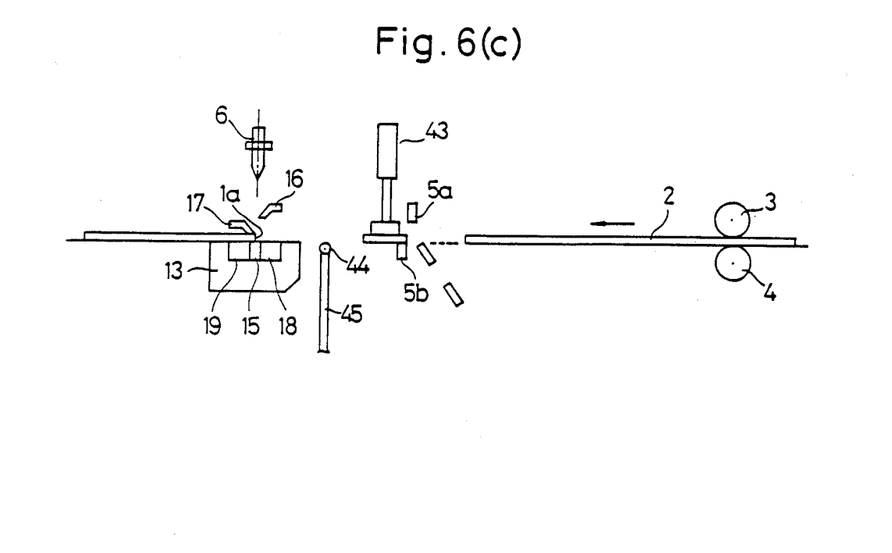
Figure 6D:
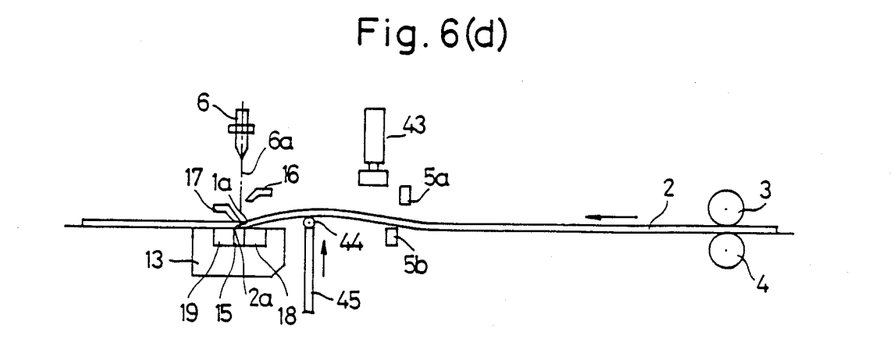

After the preceding steel strip 1 has been fed by the pair of pinch rollers 3 and 4 and its trailing end has been cut by the upper and lower blades 5a and 5b, the strip 1 is brought to the welding position, i.e., the movable table 13 as shown in FIG. 6(a). On the movable table 13, the resultant end edge 1a of the trailing end of the preceding steel strip 1 is brought into register with the torch running line 6a, and the preceding steel strip 1 is secured at this position by lowering the securement clamp piece 17 and also by exciting the electromagnetic chuck 19, as shown in FIG. 6(b), thereby magnetizing the end edge 1a of strip 1. Subsequently, the succeeding steel strip 2 is fed by the pair of pinch rollers 3 and 4 up to the cutting position as shown in FIG. 6(b). Then the leading end of the succeeding steel strip 2 like the trailing end of the preceding steel strip 1, is cut by the upper and lower blades 5a and 5b with the edge aligned (see FIG. 6(b), and then the scrap is removed by the scrap removal unit 43 (see FIG. 6c)). Subsequently, the succeeding steel strip 2 is fed to the downstream side by the pair of pinch rollers 3 and 4.

At this time, the roller 44 is raised when it is passed by the leading end of the succeeding steel strip 2. The roller 44 is provided at the upstream side of the torch 6 and is adapted to be raised up to a level corresponding to the thickness of the steel strips. For example, when the thickness is about 0.20 mm, the level is adjusted to about 1 cm. Since the succeeding steel strip 2 is very thin, e.g., 0.35 mm or less in thickness, by raising the roller 44 the end edge 2a of the leading end is directed obliquely downwards (see FIG. 6(d)). In this state the succeeding steel strip 2 is fed by the pair of pinch rollers 3 and 4 such that the end edge 2a at the leading end slide on the movable table 13 toward the end edge 1a without raising the end edge 2a from the surface of the movable table 13.

Figure 6E:
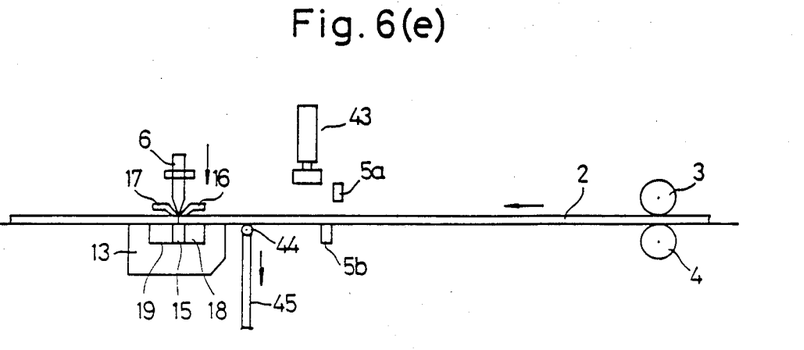

As the succeeding steel strip 2 is fed in this way, the end edge 2a of the succeeding steel strip 2 sliding on the movable table 13 approaches the end edge 1a of the trailing end of the preceding steel strip 1 as shown in FIG. 6(d). Since the trailing end of the preceding steel strip 1 has been magnetized by the electromagnetic chuck 19 as noted above, the end edge 2a is attracted by the end edge 1a of preceding strip 1 and perfect close contact between the two end edges 1a and 2a can be obtained. More specifically since the end edge 1a of the trailing end of the preceding steel strip 1 has been magnetized by the electromagnetic chuck 19, the approaching end edge 2a of the leading end of the succeeding steel strip 2 is strongly attracted in a downwardly directed state so that it is possible to obtain a perfect butting without substantial gap formed between the two end edges 1a and 2a. After the completion of the butting the roller 44 is lowered. Then the succeeding steel strip 2 has its rear surface attracted by the other electromagnetic chuck 18, and its front surface clamped by the securement clamp 16 (see FIG. 6(e)). Thereafter the torch running line 6a and butting line are brought into register by causing parallel movement and revolution of the movable table 13 with two enlargement units 38. In this state the end edges 1a, 2a are butt-welded together by driving the torch 6.

Namely, when butting two end edges 1a and 2a formed by cutting opposite ends of preceding and succeeding steel strips 1 and 2 it is sometimes liable that the two end edges 1a and 2a are not flush but are stepped. Even in this case, since two electromagnetic chucks 18 and 19 are provided on the movable table 13 on the opposite sides of the back bar 15 right underneath the torch 6 and the securement clamp 16 is provided for vertical movement on the other electromagnetic chuck 18, it is possible to correct any bending or warping of the succeeding steel strip 2 and thus remove any step by energizing the other electromagnetic chuck 18.

Figure 7:
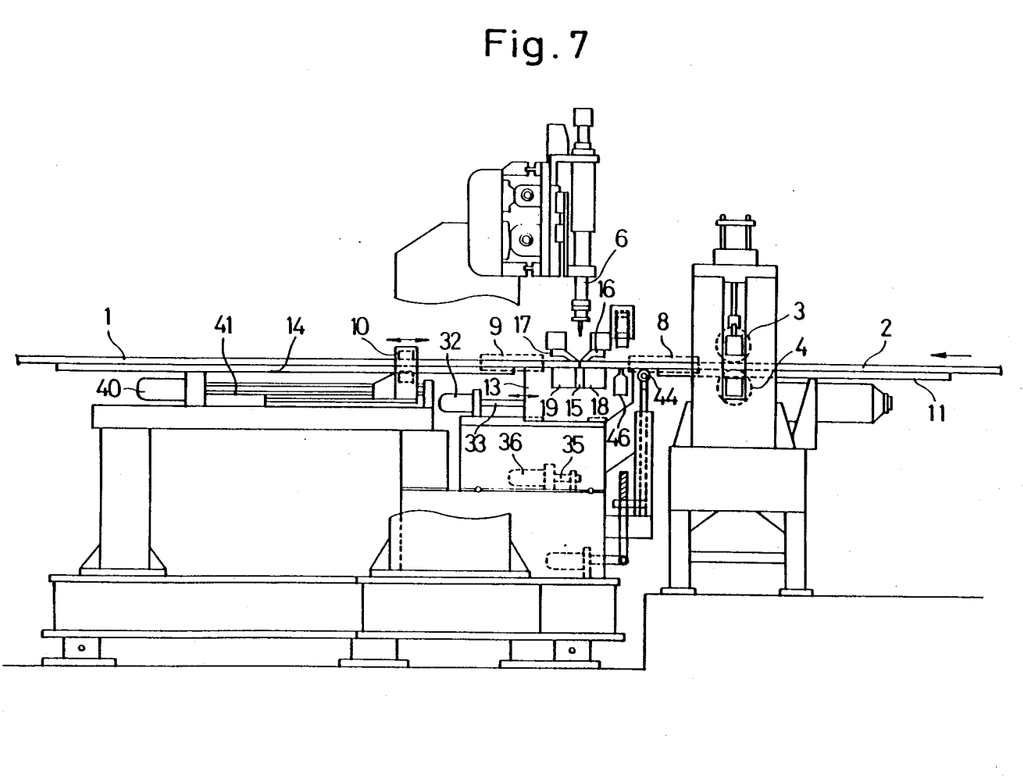
FIG. 7 is a sectional view showing a cutter/welder utilizing a laser beam in a different embodiment of the invention.
Figure 8:
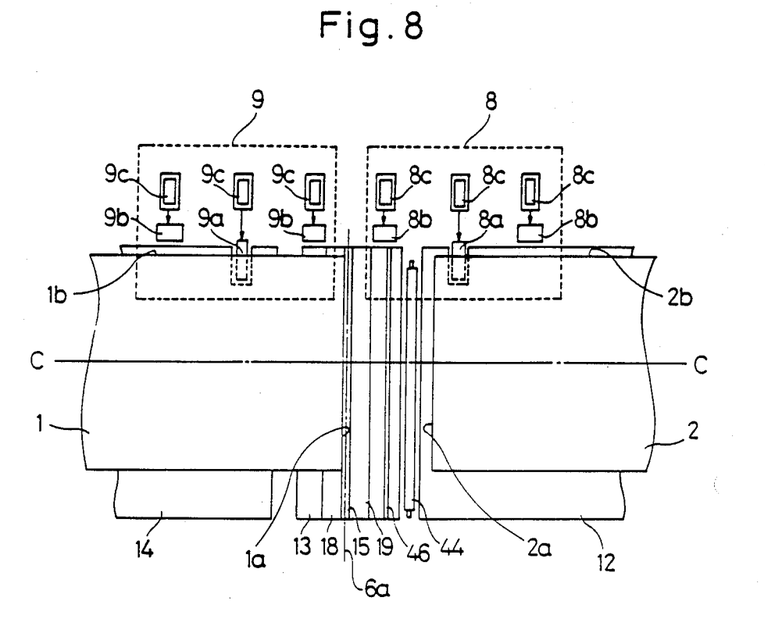
FIG. 8 is a plan view showing an example of aligning units constituting part of the cutter/welder shown in FIG. 7.

In the above example a laser beam welding torch is used as the torch 6. As the laser beam welding torch there have been developed various torches different with different power sources. Usually, carbonic acid gas laser beam welding torches are used, but also laser beam welding torches using iodine lasers or the like as power source may be used.

Where the torch 6 is constructed as a laser beam welding torch for cutting and welding steel strips with a thickness of about 0.1 mm there is no need of providing the cutting unit 5 consisting of the upper and lower blades 5a and 5b upstream the torch 6. In other words, it is possible to construct a cutter/welder as part of a continuous processing line as shown in FIGS. 7 and 8. In this cutter/welder the facing ends of the two steel strips 1 and 2 are cut and fusion separated by the torch 6 and then the cut end surfaces 1a and 2a of the two steel strips 1 and 2 are caused to abut each other and then welded. In this case the cutting by the fusion separation and butt welding are done by the torch 6. Therefore, while the construction shown in shown in FIG. 7 has only two aligning units 8 and 9. Also, the table 13 shown in FIG. 7 is provided with a fusion separation groove 46 in addition to the back bar 15. For the rest, the construction is the same as that shown in FIG. 1.

In FIG. 7, the preceding steel strip 1 which has been fed by the pair of. i.e., upper and lower pinch rollers provided on the upstream side and movable clamp 10 provided on the downstream side, is fed up to the movable table 13 underneath the torch 6. This movable table 13, like the movable table shown in FIGS. 1 and 2, is capable of parallel movement in a direction of the center line C—C in the continuous processing line (see FIG. 8) and revolution by the revolving table 20 about the revolving section 21. Thus, the side edge 1b of the preceding steel strip 1 (see FIG. 8) is made parallel to the center line C—C by the aligning unit 9, and in this state the trailing end is cut on the fusion separation groove 46 by fusion separation by the torch 6, subsequently, the preceding steel strip 1 is fed by a predetermined distance by the downstream side movable clamp 10. The succeeding steel strip 2 is also fed by the pair of pinch rollers 3 and 4 up to the position of the fusion separation groove 46 of the movable 13. Then, as in the case of the preceding steel strip 1 the side edge 2b (see FIG. 8) is made parallel to the center line C—C by the aligning unit 8, and the end is cut by the torch 6. The cut end edges 1a and 2a of the preceding and succeeding steel strips 1 and 2 are then caused to abut each other on the back bar 15 in the manner as described above and then welded by the torch 6.

More specifically the torch 6 effects cutting of the facing ends of the two steel strips 1 by fusion separation and butt welding of the cut surfaces 1a and 2a. The movable table 13 has the fusion separation groove 46 and back bar 15 provided in the mentioned order from the upstream side and like the arrangement of FIG. 1 electromagnetic chucks 18 and 19 are provided on the opposite sides of the back bar 15.

Thus as shown in FIG. 8, after the side edges 1b and 2b of the preceding and succeeding steel strips 1 and 2 have been aligned by the aligning units 9 and 8, the ends of the steel strips are cut by fusion separation on the fusion separation groove 46 by the torch 6. When butting the cut end surface the trailing end of the preceding steel strip 1 is fed to a position on the back bar 15, and the end edges 1a as the butting surface to be butted is brought into register with the torch running line 6a and then secured and magnetized by the electromagnetic chuck 19. In this state, the cut end surface 2a at the leading end of the succeeding steel strip 2 is caused to approach the end edge 1a. As a result, the end edge 2a is attracted so that it is reliably caused to butt the end edge 1a.

The aligning units 8 and 9, as shown in FIG. 8, consist of respective electromagnetic chucks 8a and 9a and reference blocks 8b and 9b. The electromagnetic chucks 8a and 9a and reference blocks 8b and 9b are movable by extension/contraction devices 8c and 9c in a direction perpendicular to the center line C—C of the continuous processing line. Thus, when the facing ends of the preceding and succeeding steel strips 1 and 2 are cut by fusion separation by the torch 6, the aligning units 9 and 8 are used, and when affecting the abutting on the back bar 15 prior to the welding, the aligning units 9 and 8 are used respectively for the respective preceding and succeeding steel strips 1 and 2.

The cutting and welding as described above are suited for steel strips with thickness ranging for 0.05 to 1.0 mm, and particularly for silicon steel strips. The reason for this is that steel strips with thicknesses less than 0.05 mm are difficult to be cut either by shearing fusion separation, grinding, etc. while steel strips with thickness of 1.0 mm or above may be cut and welded in the prior art process, i.e., without need of using the present invention.

As has been described in the foregoing, the method and apparatus for cutting and welding steel strips according to the invention are very effective when joining together facing ends of preceding and succeeding steel strips for permitting a continuous rolling or other processing or when joining together silicon steel strips or the like by welding before supplying them as a product to the customer particularly for the purpose which weight as required by the customer. In these cases, at the time of cutting, causing the abutting and welding steel strips the ends of the steel strips are cut or caused to abut with high accuracy by making the center line of the steel strips to be in register or parallel with the center line of the processing line. Thus, it is possible to obtain high quality weldment.

Further since even with steel strips of about 0.1 mm. for instance, high accuracy abutting can be obtained, it is possible to obtain high performance laser beam welding. Further, when the high performance laser beam welding is applied the joined steel strip can be wound into the form of a coil without any flaw formed even if the weld is not removed. Thus, the invention is very effective for the joining of silicon steel strips by welding.

What is claimed is:

1. In a continuous processing line, in which facing ends of preceding and succeeding steel strips are cut and the cut end surfaces are caused to abut as butt surfaces and are welded along the butt line formed by the abutting, a method of cutting and welding steel strips, in which, when cutting, abutting and welding facing ends of the steel strips, at the time of the cutting or abutting prior to the welding, either said preceding steel strip or said succeeding steel strip is attracted by an electromagnetic chuck in at least one work table in said continuous processing line, and said electromagnetic chuck is moved to pull said preceding or succeeding steel strip until it strikes a reference block disposed parallel to the center line of said continuous processing line to align one edge of said preceding or succeeding steel strip to be parallel to said center line.

2. A method of cutting and welding steel strips according to claim 1, wherein after one edge of said preceding or succeeding steel strip is brought into contact with said reference block, the magnetic force of said electromagnetic chuck is adjusted through current adjustment to cause a slip of said preceding or succeeding steel strip with respect to said electromagnetic chuck, thereby aligning said one edge.

3. A method of cutting and welding steel strips according to claim 1, wherein the facing end of said preceding or succeeding steel strip is cut by shearing with a pair of blades.

4. A method of cutting and welding steel strips according to claim 1, wherein the facing end of said preceding or succeeding steel strip is cut by fusion separation using a laser beam.

5. A method of cutting and welding steel strips according to claim 1, wherein facing end of said preceding or succeeding steel strip is cut by grinding with a grindstone.

6. A method of cutting and welding steel strips according to claim 1, wherein the cut end surfaces of said preceding and succeeding steel strips are welded by a laser beam along said abutting line formed between said butt surfaces.

7. A method of cutting and welding steel strips according to claim 1, wherein the cut end surfaces of said preceding and succeeding steel strips are arc welded according to said butt line formed between the butt surfaces.

8. A method of cutting and welding steel strips according to claim 1, wherein said preceding or succeeding steel strip has thickness ranging from 0.05 to 1.0 mm.

9. A method of cutting and welding steel strips according to claim 1, wherein said preceding or succeeding steel strip is a silicon steel strip.

10. In a continuous processing line, in which the facing ends of preceding and succeeding steel strips are cut, and the cut end surfaces are caused to abut as butt surfaces and are welded along the butt line formed by the abutting, a method of cutting and welding wherein, when cutting, abutting and welding the facing ends of said steel strips, at the time of the abutting, on at least one work table in said continuous processing line, one of said steel strips is held attracted by an electromagnetic chuck at a position either upstream or downstream a running line, along which a torch for effecting said welding runs in a direction perpendicular to the center line of said continuous processing line, with one edge of the steel strip aligned to be parallel to said center line and the butt surface at said facing end in register with said running line, a portion of the other steel strip adjacent to said facing end is raised so that said butt surface is directed downwardly and obliquely toward said butt surface of said one steel strip, and in this state said butt surface of said facing end of said other steel strip is caused to approach said butt surface of said one steel strip.

11. A method of cutting and welding steel strips according to claim 10, wherein said preceding or succeeding steel strip has a thickness ranging from 0.05 to 1.0 mm.

12. A method of cutting and welding steel strips according to claim 10, wherein said preceding and succeeding steel strips are silicon steel strips.

13. A method for butt-welding preceding and succeeding steel strips using a laser beam, at a continuous processing line, in which a trailing end of said preceding strip and a leading end of said succeeding steel strip are cut to form a trailing end edge and a leading edge, respectively, and then said trailing end edge and said leading end edge are butted against each other, thereby forming a butting line between said trailing end edge and said leading end edge and thereafter said preceding and succeeding steel strips are butt-welded by running a laser beam torch along a torch running line in conformity with said butting line, characterized in that said method comprises the steps of:

aligning one side edge of said preceding or succeeding steel strip to be parallel to a center line existing in said continuous processing line, by aligning an electromagnetic chuck, which is moved to pull said preceding or succeeding steel strip until it is brought into contact with a reference block disposed parallel to the center line of said continuous processing line, said aligning unit being provided at a position adjoining at least one work table in said continuous line;

cutting said trailing end of said preceding steel strip to form a trailing end edge and cutting said leading end of said succeeding steel strip to form a leading end edge;

forming a butting line between said trailing end edge and said leading end edge comprising the steps of positioning said trailing end registor with said torch running line, magnetizing said trailing end edge by means of an electromagnetic chuck existing beneath said laser beam torch so as to generate a magnetic attraction in said trailing end, directing said leading end edge downwardly and obliquely toward said trailing end edge having magnetic attraction therein, and approaching and butting said leading end edge against said trailing end edge; and butt-welding said trailing end edge and said leading end edge along said butting line by running said laser beam torch along said torch running line.

14. A method of butt-welding preceding and succeeding steel strips using a laser beam according to claim 13, wherein said preceding or succeeding steel strip has a thickness ranging from 0.05 to 1.0 mm.

15. A method of butt-welding preceding and succeeding steel strips according to claim 13, wherein said preceding and succeeding steel strips are silicon steel strips.

* * * * *